US009357359B2

(12) United States Patent
Mandyam et al.

(10) Patent No.: US 9,357,359 B2
(45) Date of Patent: May 31, 2016

(54) DYNAMIC QUALITY OF SERVICE (QOS) FOR SERVICES OVER CELLULAR

(71) Applicant: QUALCOMM Incorporated, San Diego, CA (US)

(72) Inventors: Giridhar Dhati Mandyam, San Diego, CA (US); Mark Maggenti, Del Mar, CA (US); Arvind Vardarajan Santhanam, San Diego, CA (US); Kirankumar Anchan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 101 days.

(21) Appl. No.: 14/166,603

(22) Filed: Jan. 28, 2014

(65) Prior Publication Data

US 2014/0219083 A1    Aug. 7, 2014

Related U.S. Application Data

(60) Provisional application No. 61/760,808, filed on Feb. 5, 2013.

(51) Int. Cl.
*H04W 28/02*    (2009.01)
*H04W 4/10*    (2009.01)
*H04L 29/06*    (2006.01)
*H04W 76/00*    (2009.01)
(Continued)

(52) U.S. Cl.
CPC ............ *H04W 4/10* (2013.01); *H04L 65/00* (2013.01); *H04L 65/1083* (2013.01); *H04L 65/4038* (2013.01); *H04L 65/4061* (2013.01); *H04L 65/80* (2013.01); *H04W 28/24* (2013.01); *H04W 76/005* (2013.01); *H04M 3/2227* (2013.01)

(58) Field of Classification Search
CPC ... H04W 28/24; H04W 76/06; H04W 76/064; H04W 52/0206; H04W 84/12; H04W 72/08; H04L 65/40; H04L 65/4038
USPC .................................. 370/252–392; 445/522
See application file for complete search history.

(56) References Cited

U.S. PATENT DOCUMENTS 6,590,885 B1 * 7/2003 Jorgensen ................. H04L 1/20
370/328
8,010,143 B2 * 8/2011 Subramanian et al. ....... 455/518
8,023,981 B2   9/2011 Rosen et al.
(Continued)

FOREIGN PATENT DOCUMENTS

EP            2009840 A1    12/2008
WO       2006038083 A1     4/2006
WO    WO 2006038083 A1 *   4/2006  ........ H04L 29/06027

OTHER PUBLICATIONS

International Search Report and Written Opinion—PCT/US2014/014502—ISAEPO—Mar. 28, 2014.
(Continued)

*Primary Examiner* — Afsar M Qureshi
(74) *Attorney, Agent, or Firm* — Muncy, Geissler, Olds & Lowe, P.C.

(57) ABSTRACT

The disclosure is related to dynamically applying quality of service (QoS) to a call. An aspect determines a packet transmission state of a subscriber on the call, determines whether or not the QoS is allocated to the subscriber, and allocates the QoS to the subscriber based on the QoS not being allocated to the subscriber and the packet transmission state indicating that the subscriber is sending packets.

32 Claims, 12 Drawing Sheets

(51) Int. Cl.
*H04W 28/24* (2009.01)
*H04M 3/22* (2006.01)

(56) References Cited

U.S. PATENT DOCUMENTS

| | | | | |
|---|---|---|---|---|
| 2004/0013089 | A1* | 1/2004 | Taneja | H04L 12/5695 370/235 |
| 2006/0209891 | A1* | 9/2006 | Yamada | H04L 12/5695 370/468 |
| 2007/0171861 | A1* | 7/2007 | Akhtar | 370/329 |
| 2008/0032699 | A1* | 2/2008 | Jang et al. | 455/452.1 |
| 2009/0154397 | A1 | 6/2009 | Akhtar | |
| 2009/0232059 | A1* | 9/2009 | Sundberg et al. | 370/329 |
| 2011/0211439 | A1 | 9/2011 | Manpuria et al. | |
| 2012/0284189 | A1 | 11/2012 | Gardella et al. | |

OTHER PUBLICATIONS

Taiwan Search Report—TW103103829—TIPO—Jun. 3, 2015.

\* cited by examiner

DYNAMIC QUALITY OF SERVICE (QOS) FOR SERVICES OVER CELLULAR

CLAIM OF PRIORITY UNDER 35 U.S.C. §119

The present Application for Patent claims priority to Provisional Application No. 61/760,808, entitled "DYNAMIC QUALITY OF SERVICE (QOS) FOR SERVICES OVER CELLULAR," filed Feb. 5, 2013, and assigned to the assignee hereof and hereby expressly incorporated by reference herein.

BACKGROUND OF THE DISCLOSURE

1. Field of the Disclosure

The disclosure is directed to providing dynamic quality of service (QoS) for services over cellular/wireless communications.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Push-to-talk (PTT) is a method of conversing on half-duplex communication lines using a momentary button to switch from voice reception mode to transmit mode. PTT over cellular (PoC) is a service option for a cellular phone that permits subscribers to use their cell phones for PTT calls.

Regarding wireless access, current approaches to PoC services are dependent on the network's ability to provide adequate quality-of-service (QoS) to the subscriber because PoC services resemble telephony services in that voice media latency is of critical concern. Moreover, control signaling latency also has affiliated QoS for PoC services due to fundamental PoC features such as fast call setup, timely disposition of subscriber floor requests, and other value added services that may be delivered via PoC.

However, many operator networks are not always able to provide QoS for PoC for several reasons, including (1) a lack of a core network configuration to support PoC QoS and (2) temporary network loading conditions. The first reason could be due to an operator's inability to scale its network for both full duplex voice subscribers and PoC subscribers, and is considered more of a permanent condition. The second reason is typically due to peak loading periods and is usually predictable. Since QoS is usually allocated as part of the call setup, operators would have to consider PoC subscribers' requirements as part of their call admission control (CAC). If the operators cannot meet the QoS requirements of a PoC subscriber upon a call request, current CAC procedures would generally result in either a call denial or a degradation of the call quality by not offering QoS.

Accordingly, it would be desirable in such situations to provide an intermediate QoS offering that would allow the operator flexibility to dynamically allocate QoS to a PoC subscriber based on that PoC subscriber's state.

SUMMARY

The disclosure is directed to dynamically applying quality of service (QoS) to a call. A method of dynamically applying QoS to a call includes determining a packet transmission state of a subscriber on the call, determining whether or not the QoS is allocated to the subscriber, and allocating the QoS to the subscriber based on the QoS not being allocated to the subscriber and the packet transmission state indicating that the subscriber is sending packets.

An apparatus for dynamically applying QoS to a call includes logic configured to determine a packet transmission state of a subscriber on the call, logic configured to determine whether or not the QoS is allocated to the subscriber, and logic configured to allocate the QoS to the subscriber based on the QoS not being allocated to the subscriber and the packet transmission state indicating that the subscriber is sending packets.

An apparatus for dynamically applying QoS to a call includes means for determining a packet transmission state of a subscriber on the call, means for determining whether or not the QoS is allocated to the subscriber, and means for allocating the QoS to the subscriber based on the QoS not being allocated to the subscriber and the packet transmission state indicating that the subscriber is sending packets.

A non-transitory computer-readable medium for dynamically applying QoS to a call includes at least one instruction to determine a packet transmission state of a subscriber on the call, at least one instruction to determine whether or not the QoS is allocated to the subscriber, and at least one instruction to allocate the QoS to the subscriber based on the QoS not being allocated to the subscriber and the packet transmission state indicating that the subscriber is sending packets.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
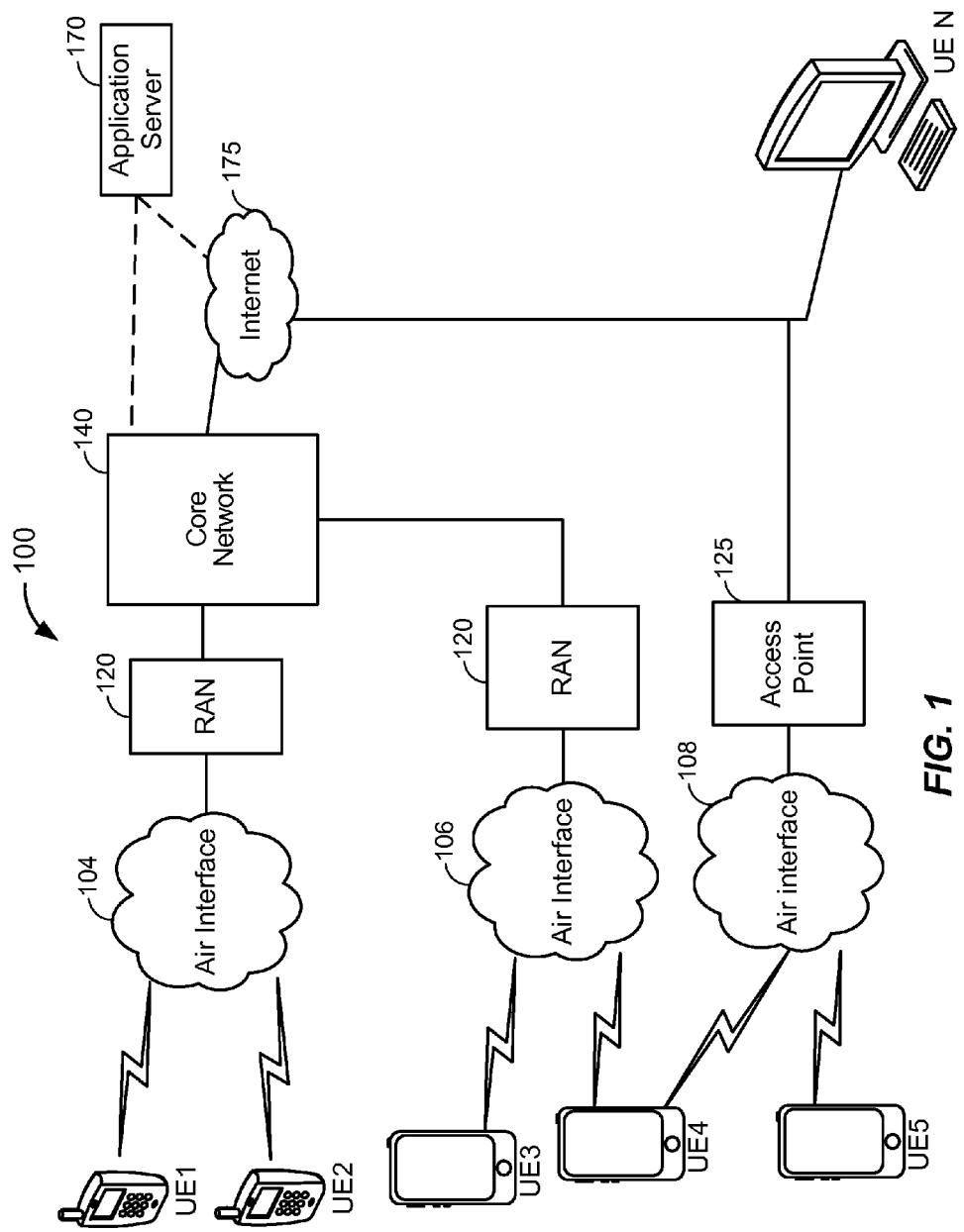
FIG. 1 illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
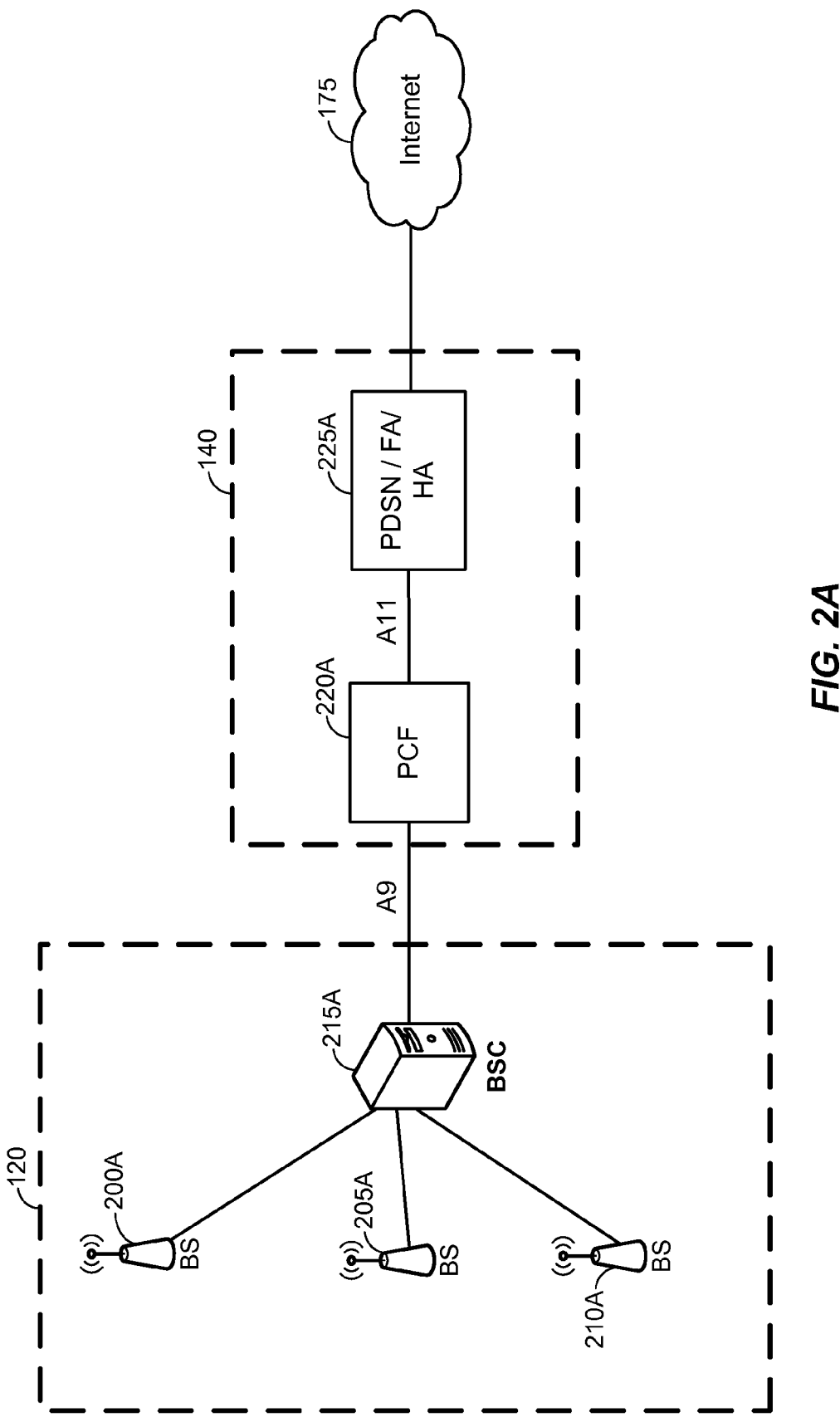
FIG. 2A illustrates an example configuration of a radio access network (RAN) and a packet-switched portion of a core network for a 1× EV-DO network in accordance with an aspect of the disclosure.

FIG. 2A illustrates an example configuration of the RAN 120 and the core network 140 for packet-switched communications in a CDMA2000 1× Evolution-Data Optimized (EV-DO) network in accordance with an aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
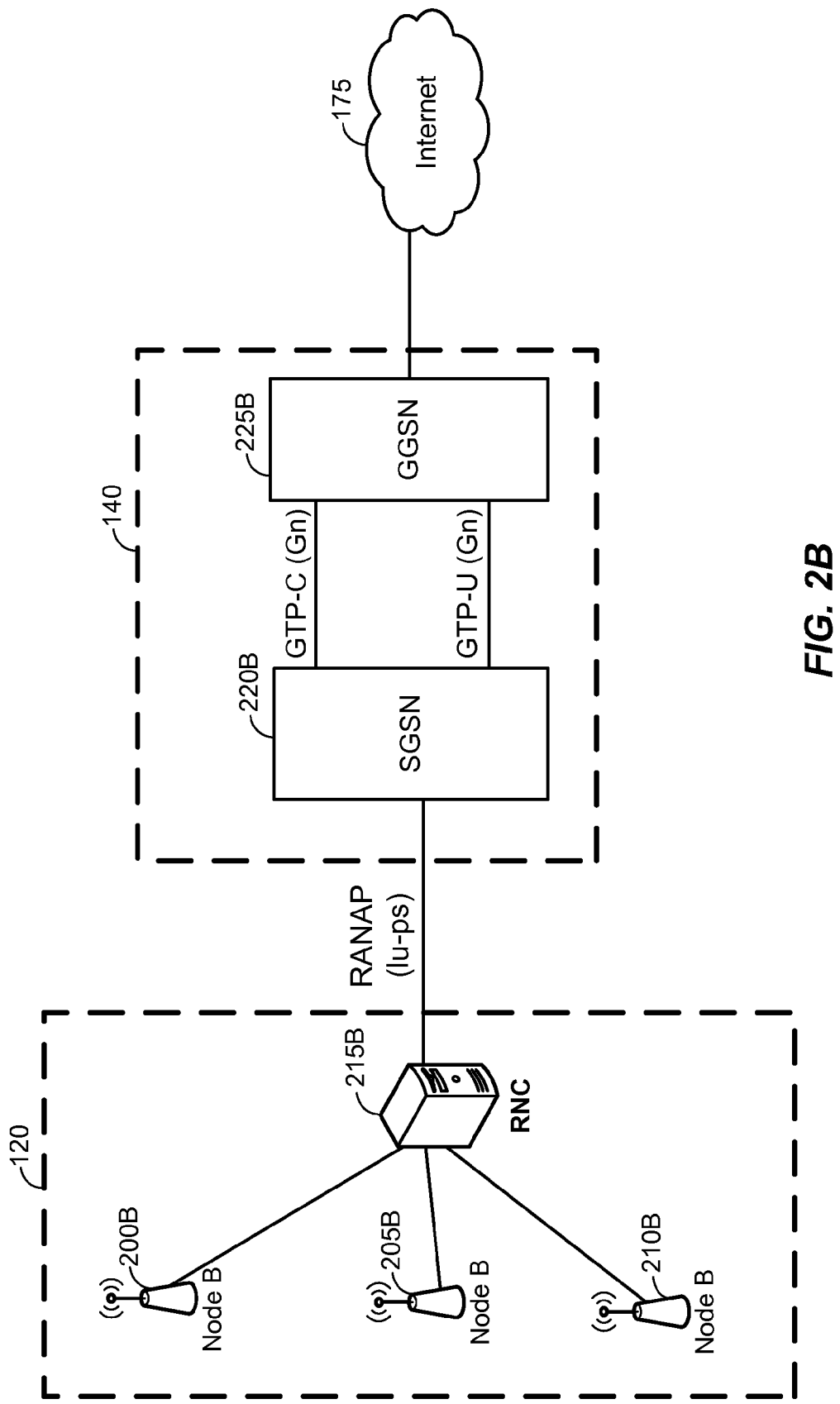
FIG. 2B illustrates an example configuration of the RAN and a packet-switched portion of a General Packet Radio Service (GPRS) core network within a 3G UMTS W-CDMA system in accordance with an aspect of the disclosure.

FIG. 2B illustrates an example configuration of the RAN 120 and a packet-switched portion of the core network 140 that is configured as a GPRS core network within a 3G UMTS W-CDMA system in accordance with an aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the example of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
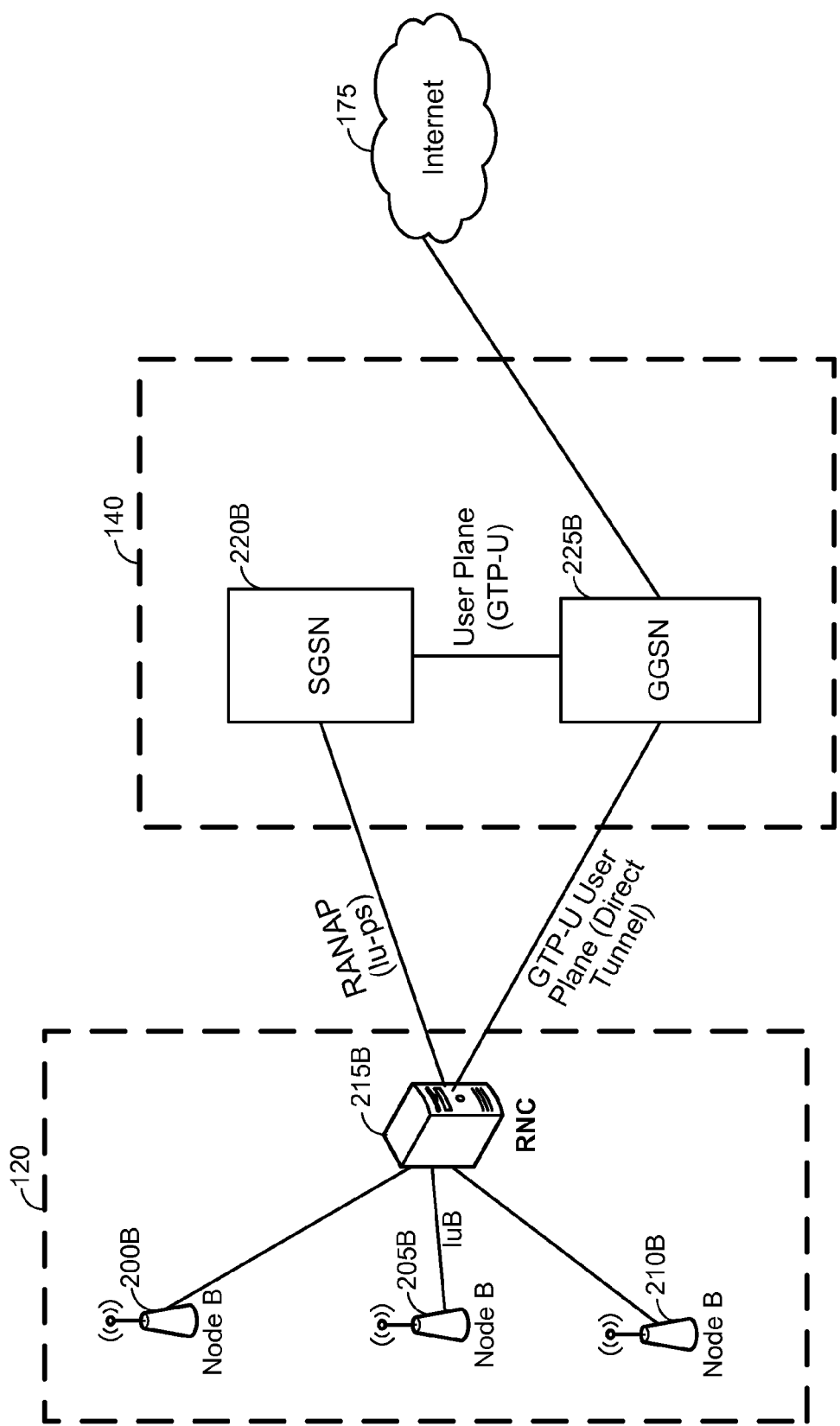
FIG. 2C illustrates another example configuration of the RAN and a packet-switched portion of a GPRS core network within a 3G UMTS W-CDMA system in accordance with an aspect of the disclosure.

FIG. 2C illustrates another example configuration of the RAN 120 and a packet-switched portion of the core network 140 that is configured as a GPRS core network within a 3G UMTS W-CDMA system in accordance with an aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
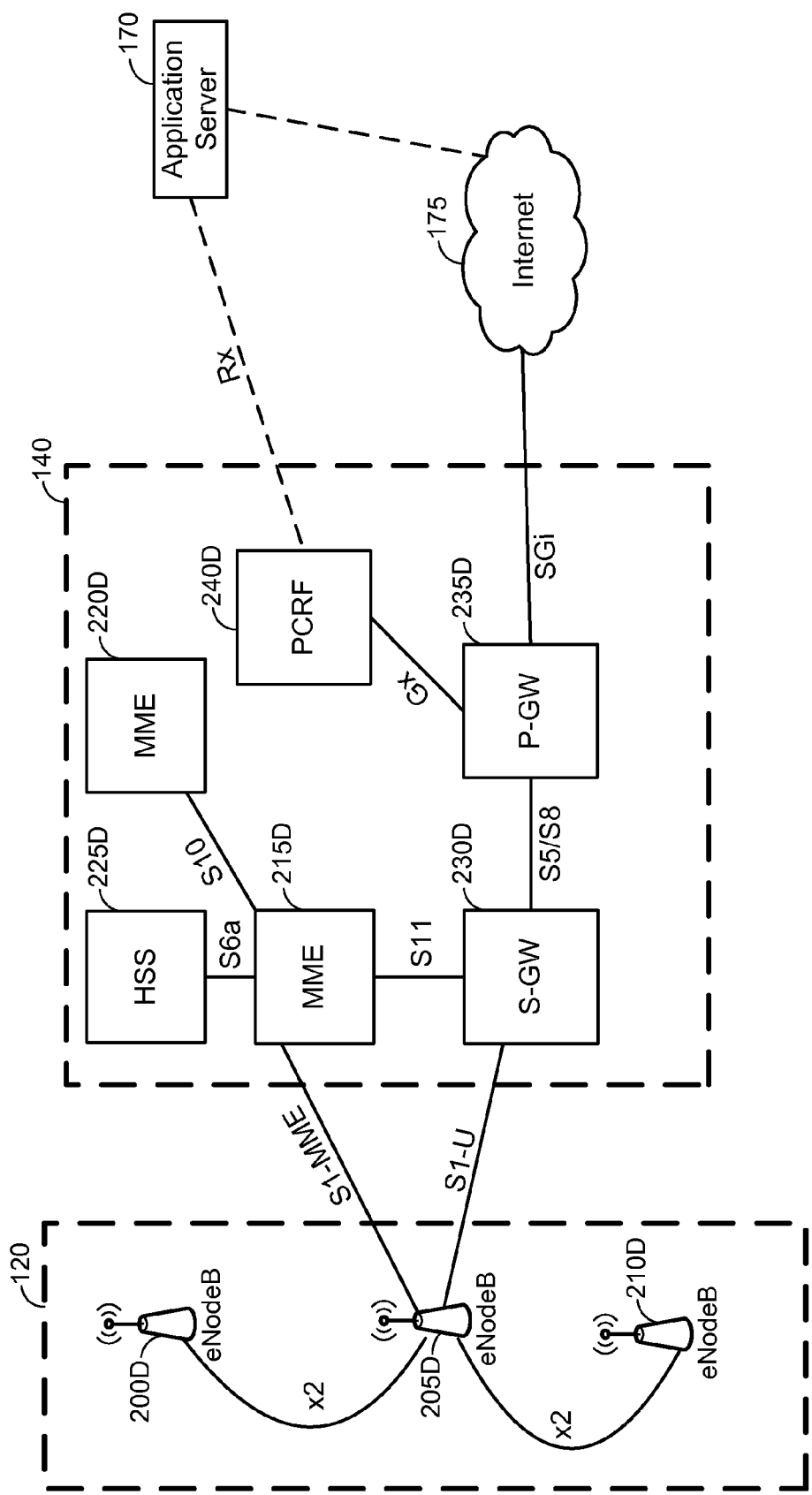
FIG. 2D illustrates an example configuration of the RAN and a packet-switched portion of the core network that is based on an Evolved Packet System (EPS) or Long Term Evolution (LTE) network in accordance with an aspect of the disclosure.

FIG. 2D illustrates an example configuration of the RAN 120 and a packet-switched portion of the core network 140 based on an Evolved Packet System (EPS) or LTE network, in accordance with an aspect of the disclosure. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
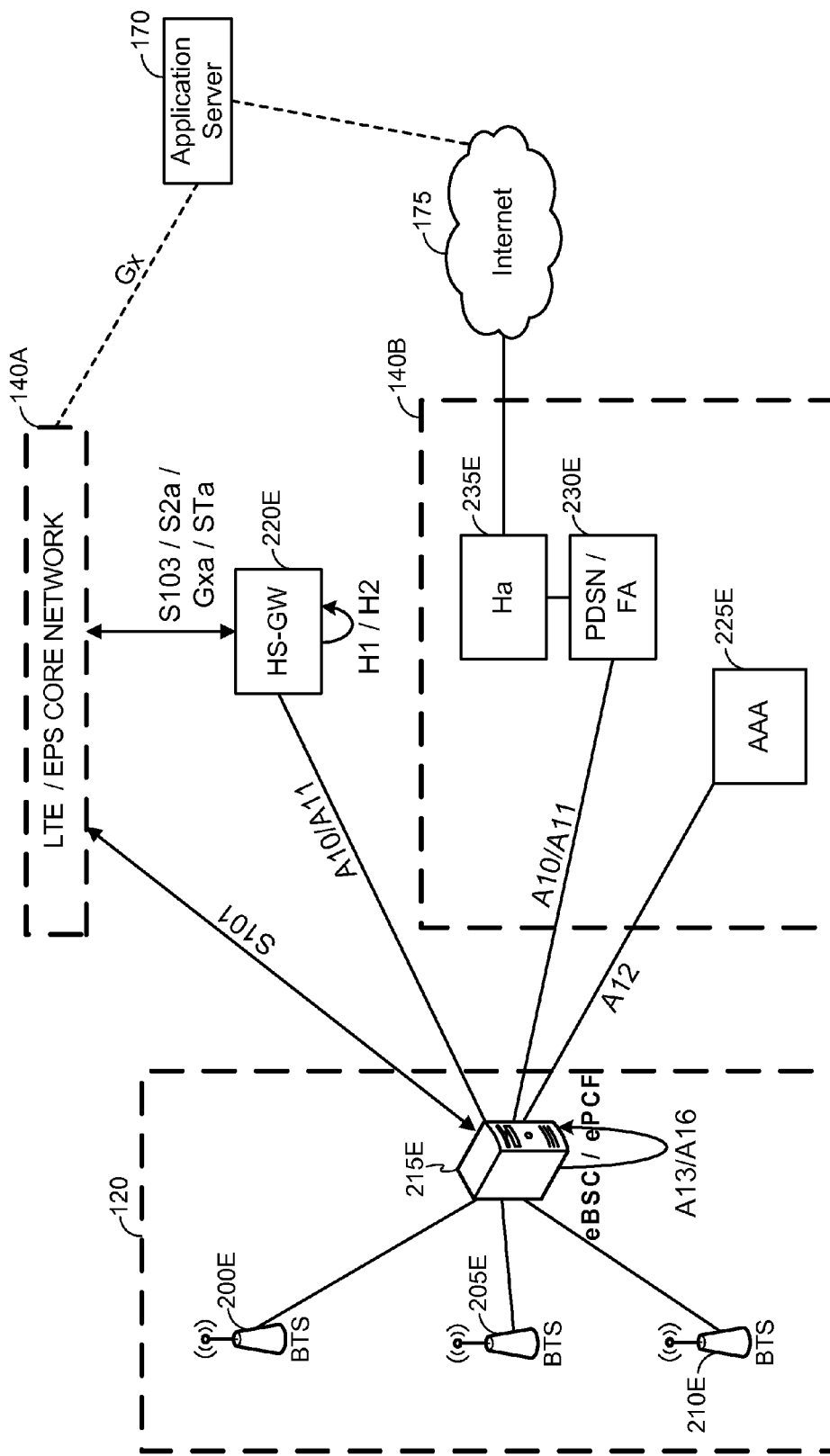
FIG. 2E illustrates an example configuration of an enhanced High Rate Packet Data (HRPD) RAN connected to an EPS or LTE network and also a packet-switched portion of an HRPD core network in accordance with an aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to evolved packet core (EPC)/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
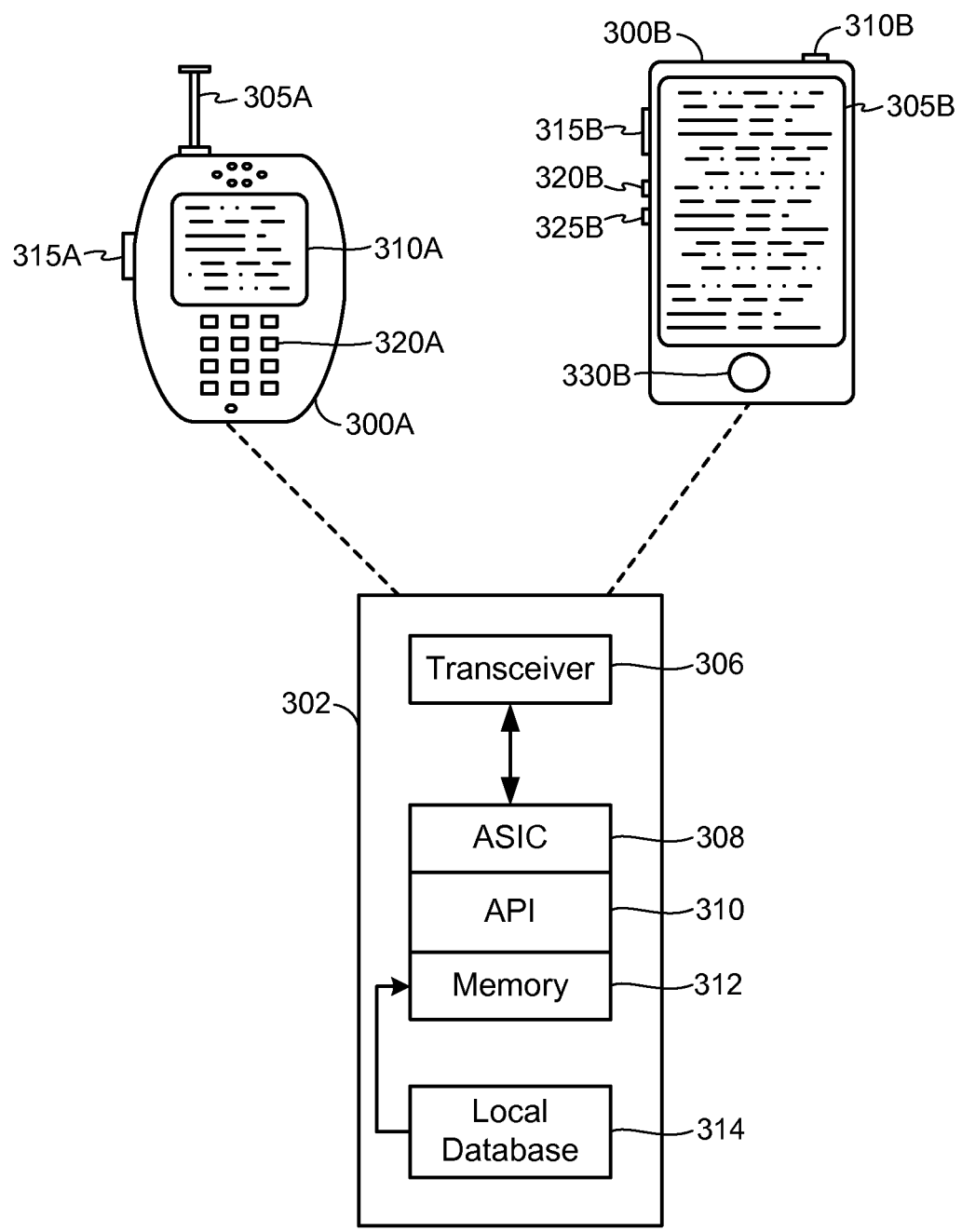
FIG. 3 illustrates examples of user equipments (UEs) in accordance with aspects of the disclosure.

FIG. 3 illustrates examples of UEs in accordance with aspects of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 4:
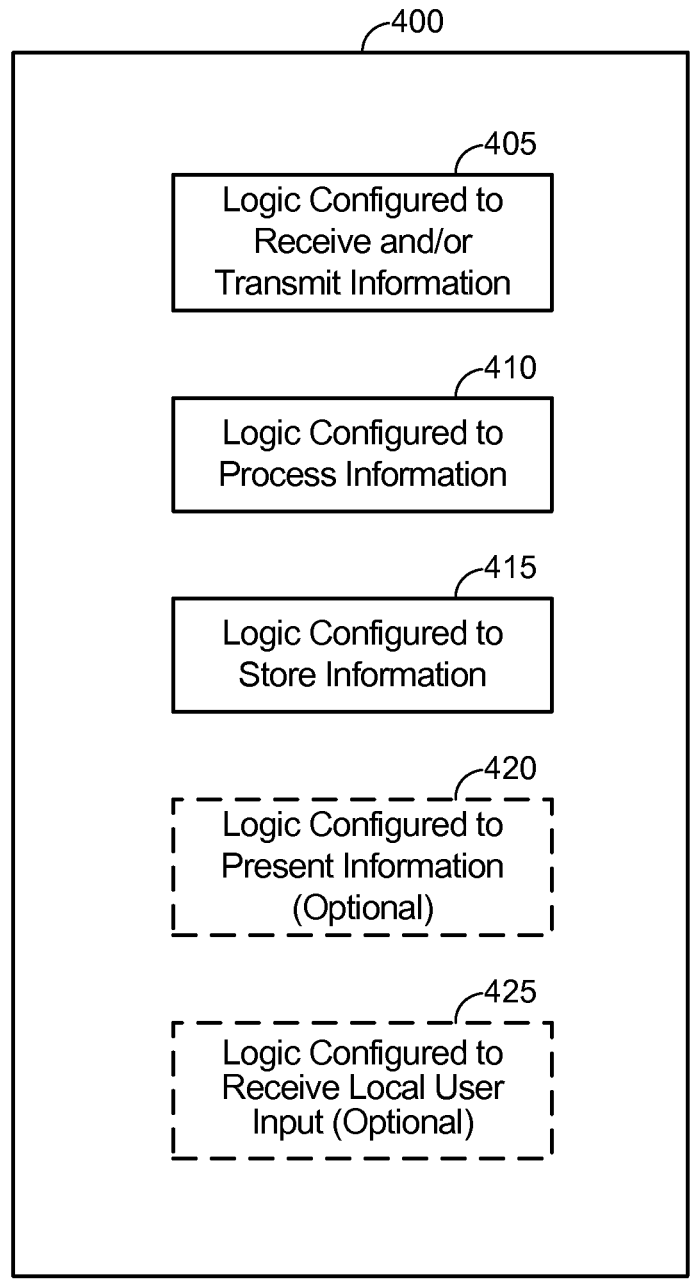
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the logic configured to process information 410 may include logic configured to determine a packet transmission state of a subscriber on a call, logic configured to determine whether or not QoS is allocated to the subscriber, and logic configured to allocate the QoS to the subscriber based on the QoS not being allocated to the subscriber and the packet transmission state indicating that the subscriber is sending packets. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Sessions that operate over networks such as 1× EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

Figure 5:
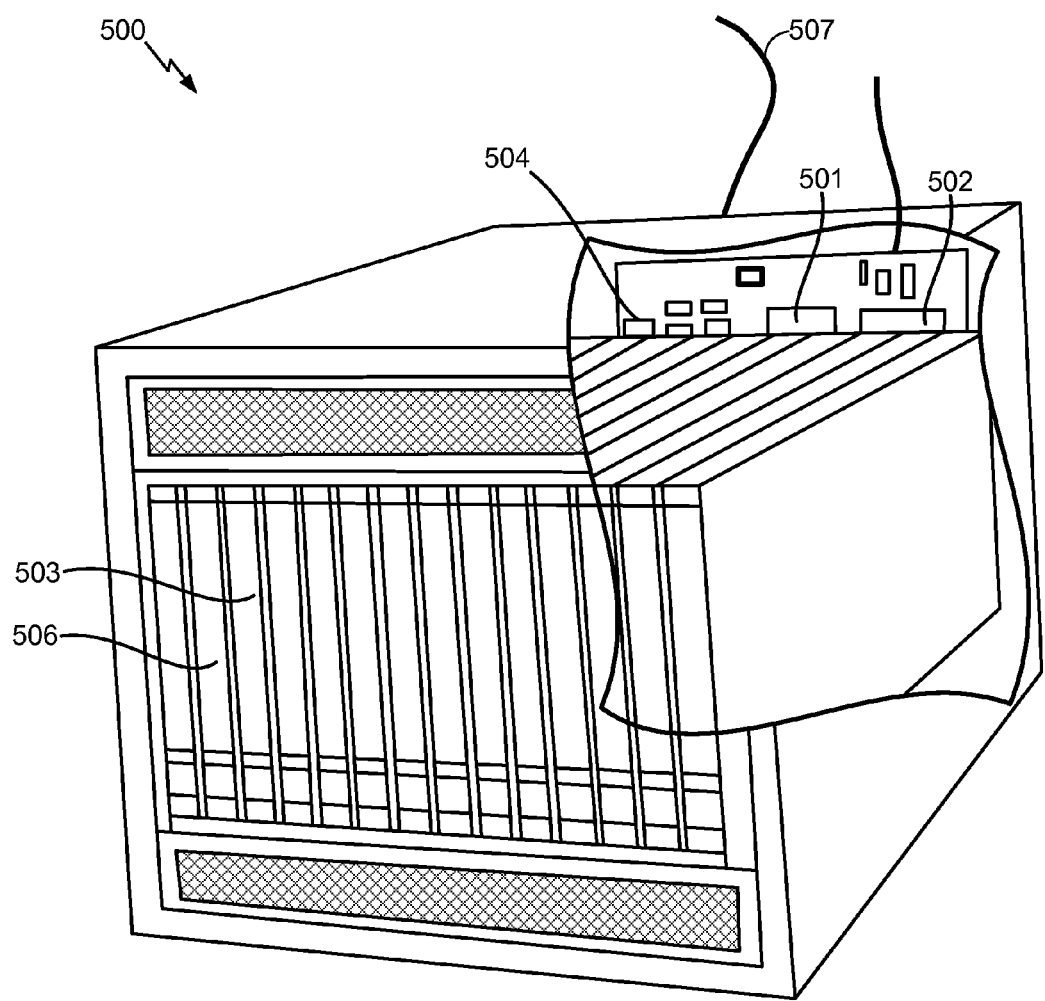
FIG. 5 illustrates an exemplary server according to various aspects of the disclosure.

The various aspects may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Push-to-talk (PTT) is a method of conversing on half-duplex communication lines using a momentary button to switch from reception mode (referred to as the "Listen" state) to transmit mode (referred to as the "Talk" state). PTT over cellular (PoC) is a service option for a cellular phone that permits subscribers to use their cell phones for PTT calls.

As used herein, a "call" may be any communication between two or more devices where the transmitting device, such as a device transmitting voice data, can be determined at any instant in time. For example, calls can include, but are not limited to, PoC calls, as used in various examples contained herein. A determination of which device is currently transmitting can be used to dynamically assign quality-of-service (QoS) to the transmitting device.

Current approaches to PoC services are dependent on the network's ability to provide adequate QoS to the subscriber because PoC services resemble telephony services in that voice media latency is of critical concern. Moreover, control signaling latency also has an affiliated QoS for PoC services due to fundamental PoC features, such as fast call setup, timely disposition of subscriber floor requests, and other value added services that may be delivered via PoC.

However, many operator networks are not always able to provide QoS for PoC services for several reasons, including (1) a lack of a core network configuration to support QoS for PoC services and (2) temporary network loading conditions. The first reason could be due to an operator's inability to scale its network for both full duplex voice subscribers and PoC subscribers, and is considered more of a permanent condition. The second reason is typically due to peak loading periods and is usually predictable. Since QoS is usually allocated as part of the call setup, operators would have to consider PoC subscribers' requirements as part of their call admission control (CAC). If the operator cannot meet the QoS requirements of a PoC subscriber upon a call request, current CAC procedures would generally result in either a call denial or a degradation of the call quality by not offering QoS.

Accordingly, it would be desirable in such situations to provide an intermediate QoS offering that would allow the network operator flexibility to dynamically allocate QoS to a PoC subscriber based on that PoC subscriber's state.

The various aspects of the disclosure provide a network operator the ability to dynamically apply QoS to a PoC subscriber based on criteria that the network operator can apply after call admission. Such criteria could be instantaneous network loading conditions, or service monetization (e.g., the subscriber's willingness to pay for a particular level of QoS).

At any given instant in time, the subscriber's transmission state is either transmitting or not. For example, for a voice call, the subscriber's transmission state may be either speaking or listening. Since the PoC service infrastructure knows the state of the subscriber, in contrast to full duplex voice telephony where this is not always possible, the PoC server can indicate to the core network the PoC subscriber's state in terms of whether the PoC subscriber is currently transmitting or not, for example, has the floor or not. Based on this information, the core network can determine whether to allocate QoS to the subscriber if it is not currently allocated.

QoS goes beyond standard audio metrics such as guaranteed bit rate and maximum packet latency. In OFDM systems, for example, service-specific scheduling of subscriber traffic can also be considered part of QoS as opposed to service-agnostic scheduling. Further, network statistical multiplexing mechanisms allow for service-preferential scheduling.

Telephony services (e.g., video or voice) can be considered a special case when trying to multiplex multiple users in a shared resource. For example, LTE provides QoS Class Identifiers (QCI) for QoS-sensitive services. QCI 1 for LTE telephony, for example, specifies a guaranteed bit rate, maximum packet delay, and maximum packet loss. As another example, WebRTC sessions can either leverage QoS or not leverage QoS. No QoS is sometimes referred to as an "over-the-top" (OTT) service.

QoS also has implications for UE battery life based on the scheduling of user traffic. For LTE and VoIP service scheduling, the normal voice traffic model assumes a "Talk" and "Listen" state. Note that for PTT/PoC, "Talk" can only occur when an individual user has the floor. Power consumption of the UE tends to be highest during the "Talk" state because a UE simultaneously sending and receiving data, meaning that the UE is running at the highest power level.

For upstream talk bursts in LTE, the UE sends scheduling requests to the base station. As a result, the base station schedules the user for both uplink (also referred to as "upstream") transmission and downlink (also referred to as "downstream") reception. The UE monitors a downlink control channel to determine when it is allocated radio resources for transmission. Downlink reception is also time multiplexed, meaning the UE can benefit from discontinuous reception (DRX).

In LTE and VoIP service scheduling, link allocations are performed on the basis of transmission time intervals (TTIs), where 1 TTI equals 1 ms. In general, there are two types of scheduling: dynamic and semi-persistent. In dynamic scheduling, scheduling requests are sent whenever new data arrives. On the uplink, scheduling request periodicity limits the UE's transmission opportunities. On the downlink, the DRX duration limits the UE's reception opportunities.

In semi-persistent scheduling (SPS), the allocations are provided at 20 or 40 ms periodicity. During "talk" mode, the benefits of SPS to the UE can be significant. For example, the benefit can be approximately 20% based first-pass estimates.

It is possible to provide SPS during the entire duration of a call, as in voice over LTE (VoLTE). However, there are a number of issues with such an approach. For instance, SPS affects the ability to statistically multiplex users. Additionally, high loading situations can result in increases in outages for both GBR and non-GBR users, but provides flexibility to the eNB. Further, providing SPS during the entire call allows for a mixture of modes, such as dynamic scheduling and SPS. It can provide dynamic scheduling for downlink data for all listeners, while providing SPS for subscribers who have a floor grant. This achieves the delay guarantees from the speaker's perspective, but may not achieve the delay guarantees from the listener(s)' perspective. As such, this option is not as good as providing SPS for the entire call, but it is better than providing dynamic scheduling for the entire call.

Finally, providing SPS during the entire call allows the eNB to leverage floor grant information when performing uplink allocation. At the very least, the eNB can delay scheduling requests from UEs that do not have the floor, which may result in a performance hit for UE-initiated signaling while not controlling floor.

Figure 6:
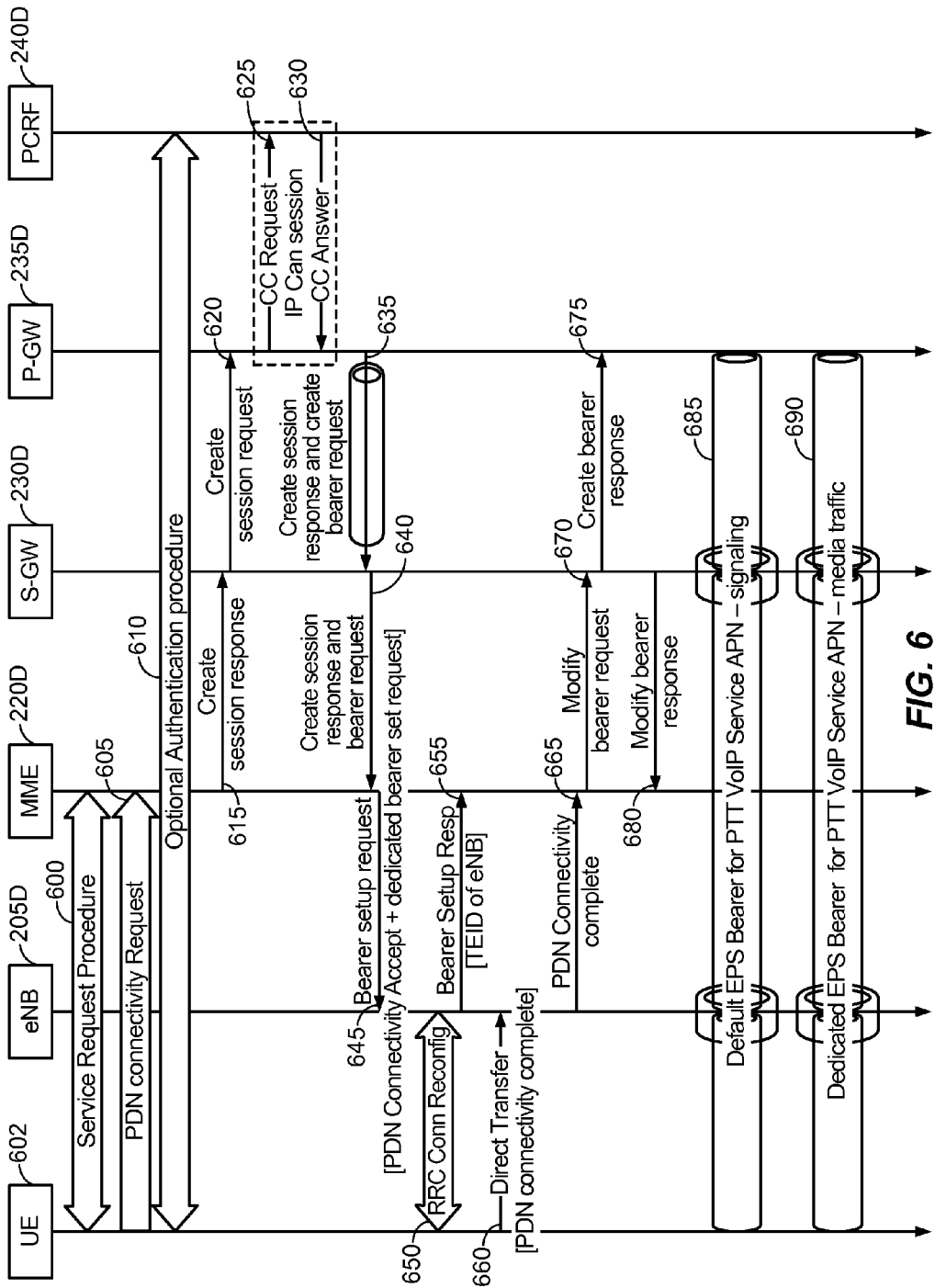
FIG. 6 illustrates an approach for a current PTT VoIP service for an LTE network-initiated QoS.

FIG. 6 illustrates an approach for a current PTT VoIP service for an LTE network-initiated QoS. The LTE network may be an LTE network such as the one depicted in FIG. 2D. Channel quality indicators (CQIs) specific to the PTT service are allocated based on network triggers, such as QCIs for signaling and media. It is desirable to leverage SPS for media only when a subscriber has been granted the floor. Note that QCI for a dedicated bearer does not contain such nuances, as it would need an external trigger from the application server to provide information to the EPC regarding the dynamic applicability of the SPS.

At 600, a UE 602 and the MME 220D perform a service request procedure. At 605, the UE 602 transmits a PDN connectivity request to the MME 220D. The UE 602 initiates the PDN connectivity request while seeking IPv4 assignment and DNS IP address assignment in the protocol configuration option (PCO). At 610, the UE 602 and the PCRF 240D perform an optional authentication procedure. At 615, the MME 220D transmits a create session response to the S-GW 230D, which, at 620, transmits a create session request to the P-GW 235D.

In response, the P-GW 235D and the PCRF 240D perform an Internet Protocol Connectivity Access Network (IP CAN) session. Specifically, at 625, the P-GW 235D sends a credit control (CC) request to the PCRF 240D, and at 630, the PCRF 240D sends a CC answer to the P-GW 235D. During the IP CAN session, the PCRF 240D detects the access point name (APN) of the PTT VoIP service and applies QCI signaling for the service to the default bearer and initiates a dedicated bearer with QCI media for the service.

At 635, the P-GW 235D creates a session response and a bearer request and sends them to the S-GW 230D. This message includes the IPv4 address and DNS IP address provided by the P-GW 235D in PCO. At 640, the S-GW 230D creates a session response and a bearer request, used to create the S5 GTP tunnels, and sends them to the MME 220D. At 645, the MME 220D sends a bearer setup request to the eNB 205D. The eNB 205D issues a PDN connectivity acceptance and a dedicated bearer setup request.

At 650, the UE 602 and the eNB 205D perform a radio resource control (RRC) connection reconfiguration. At this time, the UE 602 receives the IPv4 address and DNS IP address provided by the P-GW 235D in PCO. At 655, the eNB 205D sends a bearer setup response to the MME 220D, including the tunnel endpoint ID (TEID) of the eNB 205D. The MME 220D creates the S1 GTP tunnels.

At 660, the UE 602 performs a direct transfer to the eNB 205D, indicating that the PDN connectivity is complete. At 665, the eNB 205D sends a PDN connectivity complete message to the MME 220D. At 670, the MME 220D sends a modify bearer request to the S-GW 230D. At 675, the S-GW 230D sends a create bearer response to the P-GW 235D. At 680, the S-GW 230D sends a modify bearer response to the MME 220D.

At 685, the default EPS bearer for the signaling traffic for the PTT VoIP service APN is established. At 690, the dedicated EPS bearer for the media traffic for the PTT VoIP service APN is established.

The various aspects of the disclosure provide for the application server to communicate with the PCRF when a floor grant occurs. This may require a change in the receiver interface since the current QoS configuration is relatively static for the duration of the IP session regarding the definition of the receiver. The downstream interfaces from the PCRF may also be affected. Such interfaces include the Gx interface between the PCRF and the PDN, the S5 interface between the PDN and the serving gateway, the S11 interface between the serving gateway and the MME, and the S1-MME interface between the MME and the eNB. The eNB applies SPS to the subscriber with the current floor grant, which still requires talk mode detection. Also, the DRX cycles should not need to be changed for PoC SPS (as compared to VoLTE SPS).

Figure 7:
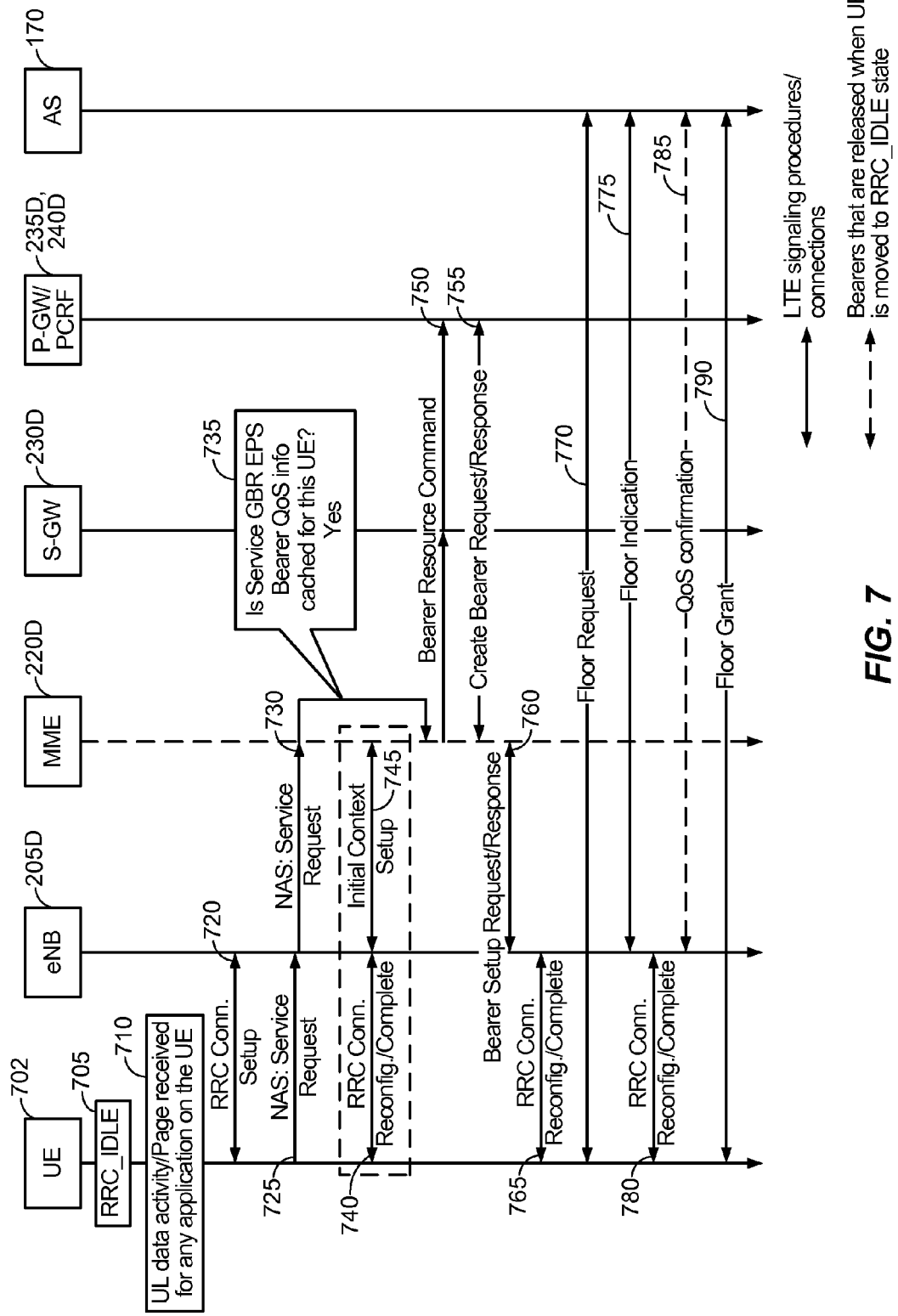
FIG. 7 illustrates a high-level call flow for a PTT VoIP service in an LTE network according to at least one aspect of the disclosure.

FIG. 7 illustrates a high-level call flow for a PTT VoIP service in an LTE network, such as the LTE network depicted in FIG. 2D, according to at least one aspect of the disclosure. At 705, a UE 702 is in an RRC IDLE state. At 710, the UE 702 performs some uplink data activity or receives a page for an application running on the UE 702. At 715, the UE 702 switches to the RRC CONNECTED state. At 720 and 725, the UE sends an RRC connection setup message and a NAS service request, respectively, to the eNB 205D. At 730, the eNB 205D sends a NAS service request to the MME 220D. At 735, the MME 220D determines that the service GBR EPS bearer QoS information for the UE 702 is cached at the MME 220D.

At 740, the UE 702 and the eNB 205D exchange RRC connection reconfiguration request and RRC connection reconfiguration complete messages. At 745, the eNB 205D and the MME 220D perform an initial context setup. The MME 220D sets up the evolved RABs for the non-GBR EPS bearers with active S5 connections.

At 750, the MME 220D sends a bearer resource command to the S-GW 230D, which sends a bearer resource command to the P-GW/PCRF 235D/240D. The bearer resource command includes a variable for the uplink and downlink speeds for the GBR EPS bearer for the PTT VoIP service and a dynamic QCI for the PTT VoIP service.

At 755, the MME 220D and the P-GW/PCRF 235D/240D exchange create bearer request and create bearer response messages. The messages include an indication of the dynamic EPS bearer QoS QCI for the service. At 760, the eNB 205D and the MME 220D exchange bearer setup request and bearer setup response messages. The request includes the dedicated EPS bearer QoS, which includes the QCI specific to the PTT VoIP service and the uplink/downlink GBR. The eNB 205D allocates the GBR and subscription profile repository (SPR) based on the loading. At 765, the UE 702 and the eNB 205D exchange RRC connection reconfiguration and RRC connection complete messages.

At 770, the UE 702 sends a floor request to the application server 170. At 775, the application server 170 sends a floor indication to the eNB 205D. At 780, the UE 702 and the eNB 205D exchange RRC connection reconfiguration and RRC connection complete messages. At 785, the application server 170 sends a QoS confirmation to the eNB 205D. Although depicted as such, the messaging does not actually pass directly between the eNB 205D and the application server 170. At 790, the application server 170 sends, and the UE 702 receives, a floor grant.

Although FIG. 7 shows the QoS confirmation occurring before the floor grant, the application server 170 may send the floor grant before confirming the QoS.

Figure 8:
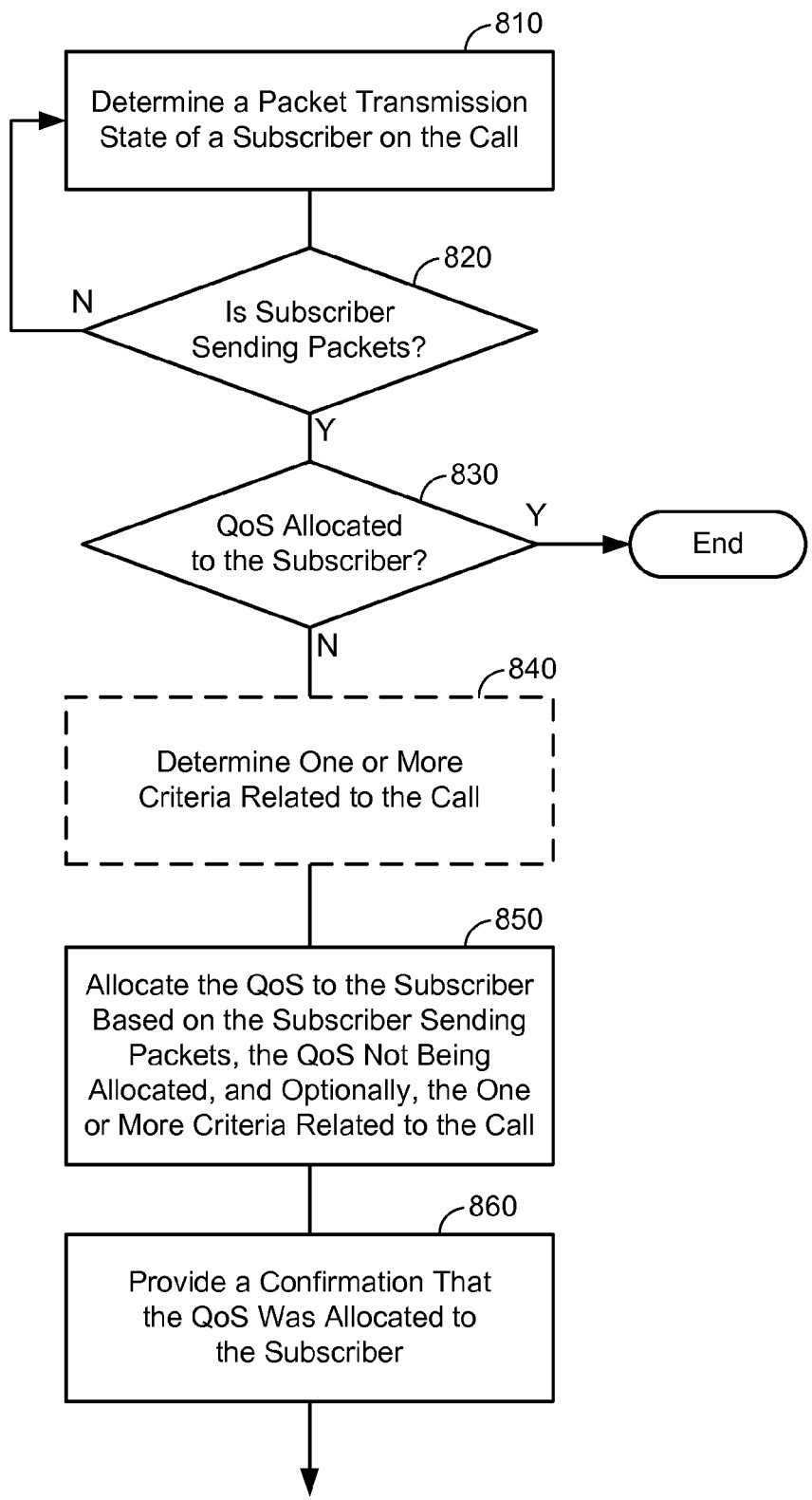
FIG. 8 illustrates an exemplary flow for dynamically applying QoS to a call according to at least one aspect of the disclosure.

FIG. 8 illustrates an exemplary flow for dynamically applying QoS to a call according to an aspect of the disclosure. The flow illustrated in FIG. 8 may be performed by an application server, such as application server 170 in FIG. 1. The call may be any call over a cellular service, such as a VoIP call, a VoLTE call, or a PoC call.

At 810, the application server determines a packet transmission state of a subscriber on the call. The packet transmission state may be that the subscriber has or has not received a floor grant, as in a PoC call, has or has not requested a floor grant, or is or is not currently communicating. "Currently communicating" may include the subscriber currently speaking, currently transmitting a media file, or anything else where the subscriber is actively sending packets.

At 820, the application server determines whether or not the subscriber is sending packets based on the determined transmission state of the subscriber. Determining whether or not the subscriber is sending packets may include determining whether or not the subscriber has received a floor grant for the call, as in a PoC call, determining whether or not the subscriber has requested a floor grant for the call, or determining whether or not the subscriber is currently communicating. Determining whether or not the subscriber is currently communicating may include determining whether or not the subscriber is currently speaking or transmitting a media file.

If the subscriber is not sending packets, the application server can wait until the subscriber begins sending packets, and/or check the packet transmission state of another subscriber on the call. If, however, the subscriber is sending packets, then the flow proceeds to 830.

At 830, the application server determines whether or not QoS is allocated to the subscriber. If it is, then the flow ends. If, however, QoS is not allocated to the subscriber, then the flow proceeds to 840.

At 840, the application server optionally determines one or more criteria related to the call. The one or more criteria may include one or more criteria related to a network load or a service monetization. The one or more criteria related to the service monetization may include one or more criteria related to whether or not the subscriber will pay for the QoS. The one or more criteria related to the network load may include one or more criteria related to whether or not there is available network capacity to allocate the QoS to the subscriber. The application server may determine the one or more criteria after the subscriber has been admitted to the call.

At 850, the application server allocates the QoS to the subscriber based on the subscriber sending packets, the QoS not being allocated to the subscriber, and, optionally, the one or more criteria related to the call. If the application server determines one or more criteria related to the call at 840, the application server may allocate the QoS to the subscriber based on the one or more criteria by, for example, allocating the QoS if the subscriber will pay for it and not allocating the QoS if the subscriber will not pay for it. As another example, the application server may allocate the QoS to the subscriber based on the one or more criteria by allocating the QoS if there is available network capacity and not allocating the QoS if there is not available network capacity.

At 860, the application server provides a confirmation that the QoS was allocated to the subscriber, as in 785 of FIG. 7. The confirmation of the QoS allocation may be provided before or after a floor grant to the subscriber.

While the aspects above have been described primarily with reference to EPS architecture in LTE-based networks, it will be appreciated that other aspects can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of dynamically applying quality of service (QoS) to a call, comprising:
    determining a packet transmission state of a subscriber after the call has started;
    determining whether or not QoS is currently allocated to the subscriber based on the packet transmission state indicating that the subscriber is sending packets related to the call; and
    allocating QoS to the subscriber based on QoS not being currently allocated to the subscriber and the packet transmission state indicating that the subscriber is sending packets related to the call.

2. The method of claim 1, further comprising:
    determining one or more criteria related to the call.

3. The method of claim 2, wherein the allocating the QoS to the subscriber is further based on the one or more criteria related to the call.

4. The method of claim 2, wherein the one or more criteria comprise one or more criteria related to a network load or a service monetization.

5. The method of claim 4, wherein the one or more criteria related to the service monetization comprises one or more criteria related to whether or not the subscriber will pay for the QoS.

6. The method of claim 4, wherein the one or more criteria related to the network load comprises one or more criteria related to whether or not there is available network capacity to allocate the QoS to the subscriber.

7. The method of claim 2, wherein the determining the one or more criteria occurs after the subscriber is admitted to the call.

8. The method of claim 1, wherein determining the packet transmission state comprises determining whether or not the subscriber has received a floor grant for the call.

9. The method of claim 1, wherein determining the packet transmission state comprises determining whether or not the subscriber has requested a floor grant for the call.

10. The method of claim 9, wherein the packet transmission state indicating that the subscriber is sending packets comprises a packet transmission state indicating that the subscriber has requested the floor grant for the call.

11. The method of claim 1, wherein determining the packet transmission state comprises determining whether or not the subscriber is currently communicating.

12. The method of claim 11, wherein determining whether or not the subscriber is currently communicating comprises determining whether or not the subscriber is speaking or transmitting a media file.

13. The method of claim 1, wherein a confirmation of the QoS allocation is provided before a floor grant to the subscriber.

14. The method of claim 1, wherein a confirmation of the QoS allocation is provided after a floor grant to the subscriber.

15. The method of claim 1, wherein the call comprises a voice over Internet Protocol (VoIP) call, a voice over Long Term Evolution (VoLTE) call, or a push-to-talk (PTT) over cellular (PoC) call.

16. An apparatus for dynamically applying quality of service (QoS) to a call, comprising:
    at least one processor configured to:
        determine a packet transmission state of a subscriber after the call has started;
        determine whether or not QoS is currently allocated to the subscriber based on the packet transmission state indicating that the subscriber is sending packets related to the call; and
        allocate QoS to the subscriber based on QoS not being currently allocated to the subscriber and the packet transmission state indicating that the subscriber is sending packets related to the call.

17. The apparatus of claim 16, wherein the at least one processor is further configured to:
    determine one or more criteria related to the call.

18. The apparatus of claim 17, wherein the allocation of the QoS to the subscriber is further based on the one or more criteria related to the call.

19. The apparatus of claim 17, wherein the one or more criteria comprise one or more criteria related to a network load or a service monetization.

20. The apparatus of claim 19, wherein the one or more criteria related to the service monetization comprises one or more criteria related to whether or not the subscriber will pay for the QoS.

21. The apparatus of claim 19, wherein the one or more criteria related to the network load comprises one or more criteria related to whether or not there is available network capacity to allocate the QoS to the subscriber.

22. The apparatus of claim 17, wherein the determination of the one or more criteria occurs after the subscriber is admitted to the call.

23. The apparatus of claim 16, wherein the at least one processor being configured to determine the packet transmission state comprises the at least one processor being configured to determine whether or not the subscriber has received a floor grant for the call.

24. The apparatus of claim 16, wherein the at least one processor being configured to determine the packet transmission state comprises the at least one processor being configured to determine whether or not the subscriber has requested a floor grant for the call.

25. The apparatus of claim 24, wherein the packet transmission state indicating that the subscriber is sending packets comprises a packet transmission state indicating that the subscriber has requested the floor grant for the call.

26. The apparatus of claim 16, wherein the at least one processor being configured to determine the packet transmission state comprises the at least one processor being configured to determine whether or not the subscriber is currently communicating.

27. The apparatus of claim 26, wherein the at least one processor being configured to determine whether or not the subscriber is currently communicating comprises the at least one processor being configured to determine whether or not the subscriber is speaking or transmitting a media file.

28. The apparatus of claim 16, wherein a confirmation of the QoS allocation is provided before a floor grant to the subscriber.

29. The apparatus of claim 16, wherein a confirmation of the QoS allocation is provided after a floor grant to the subscriber.

30. The apparatus of claim 16, wherein the call comprises a voice over Internet Protocol (VoIP) call, a voice over Long Term Evolution (VoLTE) call, or a push-to-talk (PTT) over cellular (PoC) call.

31. An apparatus for dynamically applying quality of service (QoS) to a call, comprising:
- means for determining a packet transmission state of a subscriber after the call has started;
- means for determining whether or not QoS is currently allocated to the subscriber based on the packet transmission state indicating that the subscriber is sending packets related to the call; and
- means for allocating QoS to the subscriber based on QoS not being currently allocated to the subscriber and the packet transmission state indicating that the subscriber is sending packets related to the call.

32. A non-transitory computer-readable medium for dynamically applying quality of service (QoS) to a call, comprising:
- at least one instruction to determine a packet transmission state of a subscriber after the call has started;
- at least one instruction to determine whether or not QoS is currently allocated to the subscriber based on the packet transmission state indicating that the subscriber is sending packets related to the call; and
- at least one instruction to allocate QoS to the subscriber based on QoS not being currently allocated to the subscriber and the packet transmission state indicating that the subscriber is sending packets related to the call.

* * * * *